(12) United States Patent
Colella

(10) Patent No.: US 7,953,670 B2
(45) Date of Patent: May 31, 2011

(54) BIOMETRICALLY SECURED IDENTIFICATION AUTHENTICATION AND CARD READER DEVICE

(76) Inventor: Brian A. Colella, Shady Side, MD (US)

( * ) Notice: Subject to any disclaimer, the term of this patent is extended or adjusted under 35 U.S.C. 154(b) by 0 days.

(21) Appl. No.: 12/231,544

(22) Filed: Sep. 2, 2008

(65) Prior Publication Data
US 2009/0066478 A1    Mar. 12, 2009

Related U.S. Application Data

(63) Continuation-in-part of application No. 11/646,121, filed on Dec. 27, 2006, and a continuation-in-part of application No. 11/715,543, filed on Mar. 8, 2007, now Pat. No. 7,778,935.

(60) Provisional application No. 60/967,212, filed on Aug. 31, 2007.

(51) Int. Cl.
*G06Q 20/00* (2006.01)
*G06K 5/00* (2006.01)

(52) U.S. Cl. .......................... 705/64; 235/380

(58) Field of Classification Search .............. 705/64
See application file for complete search history.

(56) References Cited

U.S. PATENT DOCUMENTS

| | | | | |
|---|---|---|---|---|
| 4,353,056 A * | 10/1982 | Tsikos | ........................... | 382/124 |
| 6,377,218 B1 * | 4/2002 | Nelson et al. | ................. | 343/702 |
| 6,609,102 B2 * | 8/2003 | Kolls | ............................. | 705/14 |
| 7,360,688 B1 * | 4/2008 | Harris | ........................... | 235/380 |
| 2007/0061868 A1 * | 3/2007 | Dvir | .................................. | 726/2 |
| 2008/0094926 A1 * | 4/2008 | Neel | ............................. | 365/201 |

* cited by examiner

*Primary Examiner* — Calvin L Hewitt, II
*Assistant Examiner* — Zeshan Qayyum
(74) *Attorney, Agent, or Firm* — Ober, Kaler, Grimes & Shriver; Royal W. Craig

(57) ABSTRACT

An intelligent Caddy-Pilot for facilitating biometric verification. The device works as a single sign-on device for an internal VPN or network or in conjunction with a central data network and may act as a card reader for various Safe Card and traditional credit cards to perform secure transactions and other objective functions, or as an; instantaneous standalone biometric authentication and identification device. The Caddy-Pilot generally comprises a Credit Card-sized housing defining an end-wise card insertion port, a USB connection port, a magnetic card strip reader head, an internal infrared receiver/transmitter, a fingerprint scanner, LCD display screen, LED indicator lights, and a programmable microprocessor and memory. At issuance, an initial scan of the user's fingerprint is completed and a portion of the digitized fingerprints scan is stored locally on Caddy Pilot along with an image of the user for later authentication. The user may then employ the Caddy-Pilot by connection to any available USB port on a web enabled device to initiate both a local biometric-secure authentication sequence as well as a network biometric authentication single sign-on sequence to fully authenticate the user. Once authenticated the user is permitted access to requested resource or data.

1 Claim, 4 Drawing Sheets

BIOMETRICALLY SECURED IDENTIFICATION AUTHENTICATION AND CARD READER DEVICE

CROSS-REFERENCE TO RELATED APPLICATIONS

The present application derives priority from U.S. provisional application Ser. No. 60/967,212 filed Aug. 31, 2007, and is a continuation-in-part of U.S. application Ser. No. 11/646,121 filed 27 Dec. 2006, and a continuation-in-part of U.S. application Ser. No. 11/715,543 filed Mar. 8, 2007 now U.S. Pat. No. 7,778,935.

BACKGROUND OF THE INVENTION

1. Field of the Invention

The present invention is a single sign-on solution for secure access to computer and/or electronic data, services or resources based on prerequisite personal identification and authentication and, more particularly, is an intelligent docking device for verifying the identity and privilege level of an individual in order to grant the permissible access through biometric evaluation.

2. Description of the Background

Modern data and computing systems store vast amounts of personal and often sensitive information about people, companies and transactions. Likewise, these same computer systems make it possible to access this information quickly and economically and provide the resources to manipulate and communicate such data with little effort. Modern data and computing systems have vastly influenced society for the better. Unfortunately, such modern technologies create new problems of their own, especially since they are inherently prone to outside attack by individuals who were never intended to have access to the data. This can result in drastic negative results for innocent people and organizations.

Unfortunately, the challenges of monitoring and controlling computer stored data and computing resources are becoming more difficult each day because hackers are becoming more sophisticated in their efforts. Cyber laws, filters and password protected security systems have only limited effectiveness in restricting access. Individuals and organizations need more control over their information and resources. Two types of access control systems are commonly employed: challenge based systems and token based systems.

Challenge based systems challenge a person seeking access to provide certain information to verify their identity so as to grant access. Often that knowledge is in the form of a user defined password or a question whose answer would be known only to a specific user. Access to a system or resource is restricted to persons with the requisite knowledge. Such systems are vulnerable to the guessing of simple passwords or the answer to security questions as well as dictionary or other systematic attacks. These systems are also vulnerable to inadvertent divulgence of the requisite knowledge by and authorized user and outright theft and can be inefficient if users frequently forget the complicated passwords needed for high levels of security (especially since some passwords need to be periodically changed within short mandated periods).

Token based systems restrict access to persons with a token, usually an identification card, used to verify identity. Anyone with possession of the card can gain access. Such systems are vulnerable to lost or stolen tokens.

Biometric verification of an individual's physiological traits has become an increasingly common method of verifying to a reasonably high certainty the identity of an individual. Biometric verification eliminates the problem of the lost or stolen token by the obvious point that such tokens are part of an individual's body. The problems associates with knowledge based challenge systems are also eliminated by biometric evaluation because such features of the individual cannot be guessed by another or forgotten by a rightful user. The individual need only be present in order to be verified, and need not memorize a password (which can be difficult in light of mandated periodic changing of passwords often required by conventional security solutions).

Biometric systems often use the unique features of the human iris, hand or facial geometry to verify identity. One of the oldest and most commonly used biometric identification method is by human fingerprinting. Biometric authentication is gaining popularity as a security measure in the digital age. For example, U.S. Pat. No. 6,950,810 to Lapsley et al. Indivos Corporation issued Sep. 27, 2005 shows a tokenless biometric electronic financial transactions method for authorization of an electronic payment between a payor and a payee using a third party provider.

United States Patent Application 20040199469 by Barillova et al. published Oct. 7, 2004 shows a method and system for authentication of online commercial transactions between a customer and a merchant comprising the steps of registering a customer with a PIN and a biometric sample, and a customer financial account. A temporary transaction code is issued to each authenticated customer; and conducting a transaction with a merchant using said temporary transaction code.

U.S. Pat. No. 5,613,012 to Hoffman et al. (Smarttouch, LLC) issued Mar. 18, 1997, and related U.S. Pat. No. 6,269,348 to Pare, Jr. et al. (Veristar Corporation) issued Jul. 31, 2001 both show a tokenless identification system and method for authorization of transactions and transmissions. The system uses a comparison of a fingerprint gathered directly from an unknown user, with an authenticated biometrics sample of the same type obtained and stored previously.

U.S. Pat. No. 6,270,011 to Gottfried issued Aug. 7, 2001 shows a method for providing secure transactions with credit cards by adding a fingerprint scanner at the point-of-sale to obtain fingerprint data, so that a credit card company database can verify the fingerprint data against stored fingerprint information and verify the transaction accordingly. The method is integrated into the existing negotiation protocol between a point-of-sale system and a credit card company database, and uses a human fingerprint and a secure algorithm. The credit card company has the customer fingerprint for comparison on its existing database. In the case of an Internet purchase, an authorization adaptor is connected to the user PC, and once the user has made the purchase request, an encrypted communication is then commenced in which a token is sent by the credit card company to the user PC, requesting fingerprint data. The authorization adaptor provides the fingerprint scan, and sends the data to the user PC in encrypted form, for transfer to the credit card company by a secure communication, for authorization. The fingerprint scanner is based on use of a new sensor employing a technology that maps and matches fingerprints, using coincidence of the features minutia on as few as twelve similar points, to determine a match.

United States Patent Application 20050165700 by Karthik Multimedia Glory published Jul. 28, 2005 shows a security system for electronic commerce for verifying the authenticity of a user including: a server authentication program installed in a web-server at a website of a web-service provider; a client software component and fingerprint scanner installed at a workstation of the user. The scanner takes and converts a biometrics image into digital data, which is then compressed and encrypted, and transmitted to the web-server.

U.S. Pat. No. 6,944,773 to Abrahams issued Sep. 13, 2005 shows a method of on-line authentication in which a user presents one or more fingerprints for authentication during an on-line transaction, such as an Internet transaction. The host system indicates how many fingerprints will be requested for authentication, randomly selects which fingerprints will be requested, and sends a request for entry of the randomly selected fingerprints, and then compares the received fingerprint data to fingerprint data stored in a database.

U.S. Pat. No. 6,241,288 issued to Bergenek et al. in 2001 shows a fingerprint identification/verification algorithm that uses bitmaps of a stored fingerprint to correlate with a bit map of an input fingerprint, wherein an accurate reference point is located. This is followed by the selection of several two-dimensional areas in the vicinity of the reference point of the input image of the fingerprint. These areas are then correlated with stored fingerprint recognition information to determine if the input fingerprint image and the stored fingerprint recognition information are sufficiently similar to identify/verify the input fingerprint.

U.S. Pat. No. 4,229,023 to Luz issued Oct. 21, 1980 shows an identity check card with a fingerprint cut away in spots to provide alternate transparent zones and partial fingerprint zones. The placement of the card over a fresh fingerprint show immediately if the latter complements the former, thus permitting a quick and reliable check to be effected.

U.S. Pat. No. 5,869,822 to Meadows et al. issued Feb. 9, 1999 shows an automated fingerprint identification system. When a person applies for a credit card they must register a finger of their choice with the card issuance company. At the company, the finger is scanned and a composite number is produced that consists of several fingerprint-identifying parameters. The composite number is encoded onto the card and is stored in a card database. When a person wants to use the card, the card is inserted into a card reader and the person's finger is scanned by a fingerprint scanner, which produces a composite number. The immediate and stored composite numbers are compared and, when similar, use of the card is allowed.

United States Patent Application 20040044621 by Huang et al. VISA published Mar. 4, 2004 shows a payment system for facilitating a payment transaction between a payer and a payee using a separate payer access device, payee access device, and a services hub.

AuthenTec Inc. has announced the TruePrint™ fingerprint reader with incorporated Bluetooth transmitter. AuthenTec's press releases claim the company has 17 pending patents, but does not state the countries in which they are pending.

Internet Commerce Account Status Information ICASI sells a third party service that requires a biometric finger-scan to authorize use of a business bank account, credit card transaction, or online commerce. Once users have registered their fingerprints, they can conduct business with thousands of participating merchants.

The TouchPass log-on security solution by NEC Technologies, Inc. offers finger-imaging technology to authenticate an individual's identity.

DigitalPersona, Inc. provides a fingerprint security system for PCs using USB fingerprint sensors. The plug-and-play USB fingerprint sensor is self-calibrating, and features auto and optimal image capture, latent image removal, a challenge-response link, and encrypted transmission of biometric information.

While the foregoing references all teach improved security through fingerprint biometrics, none does so without exposing any authentication information to possible hijack during transmission over the data network.

SUMMARY OF THE INVENTION

Accordingly, it is an object of the present invention to provide a secure identification device that can be used to permit or restrict access to information or resources via biometric security while also ensuring the privacy of the user's biometric and personal data.

It is another object of the invention to provide a device that can be connected to any universal serial bus enabled system to provide biometric security verification.

It is another object of the device to provide multi-factor authentication and multiple levels of security.

It is another object of the device to permit biometrically secure use of personal credit cards in conjunction with transactions made via the secured system.

It is another object of the device to permit handicapped accessible biometrically secure authentication.

It is still another object of the device to store biometrically secured user files and information on the device.

According to the present invention, the above-described and other objects are accomplished by providing an intelligent Caddy-Pilot for facilitating biometric verification. The device works in conjunction with a central data network and may act as a card reader for various Safe Card and traditional credit cards to perform secure transactions and other objective functions.

Each Caddy-Pilot is issued to a specific user at the time of enrollment into the system. A unique device ID is stored on the internal memory of the Caddy-Pilot and is associated with a specific user. A user may also be issued a Safe Card with its own unique identification number to be used in conjunction with the Caddy-Pilot. An example of an appropriate Safe Card is fully disclosed in applicant's co-pending U.S. patent application Ser. No. 11/715,543 filed Mar. 8, 2007 (publication no. 20070214093), which disclosure is herein incorporated by reference. At issuance, an initial scan of the user's fingerprint is completed using the fingerprint scanner integrated into the assigned Caddy Pilot and a portion of the digitized fingerprints scan is stored locally on Caddy Pilot along with an image/photo of the user for later authentication.

Once enrolled with an assigned Caddy-Pilot, the user may employ the system by connecting the Caddy-Pilot via any available USB port on a web enabled device. The Caddy-Pilot's internal processor initiates an authentication sequence by identifying its previously assigned unique identification number to the system via the USB connection and the web connection of the device to which it is attached. The system acknowledges the Caddy-Pilot and requests biometric verification of the user's identity by a fingerprint scan. The user swipes their finger on the scanner which automatically initiates a scan of their fingerprint and instantaneously captures a portion of their fingerprint minutia. The fingerprint minutia is compared to the minutia stored previously at activation for verification. The fingerprint scan is verified on Caddy Pilot itself and an image of the authorized user is displayed on an integral Caddy-Pilot LCD display for additional visual inspection if needed. Once local authentication has taken place, the Caddy-Pilot sends an encrypted packet of information to the system including the assigned user ID and Caddy-Pilot ID numbers, plus the Safe Card ID if a Safe Card is used. This data is compared and challenged with the registration record stored by the system to fully authenticate the user.

Once authentication and challenge are completed, the user is permitted access to the requested resource or data.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is an intelligent Caddy-Pilot for facilitating biometric verification and secure access to computer and/or electronic data, services or resources. The Caddy-Pilot includes a biometric-secure card reader for facilitating various safe card and traditional credit card transactions via a conventional computer workstation over a network.

Figure 1:
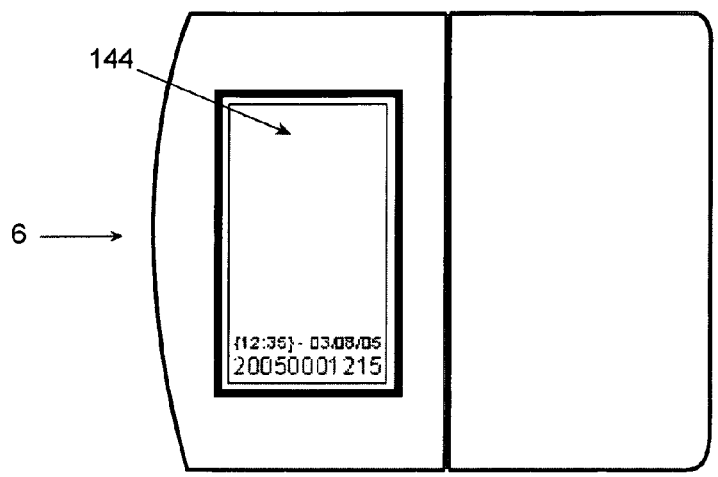
FIG. 1 is an illustration of the Caddy-Pilot 6 in a closed position from the front.
Figure 2:
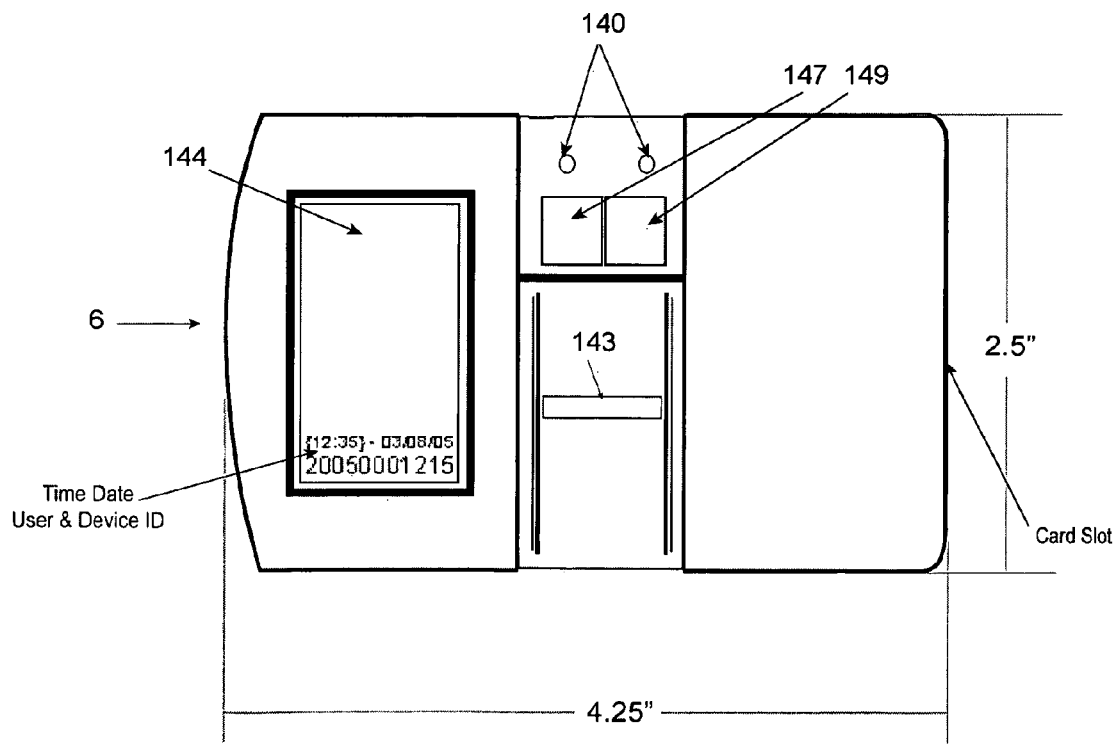
FIG. 2 illustrates the Caddy-Pilot 6 in an open position from the front.
Figure 3:
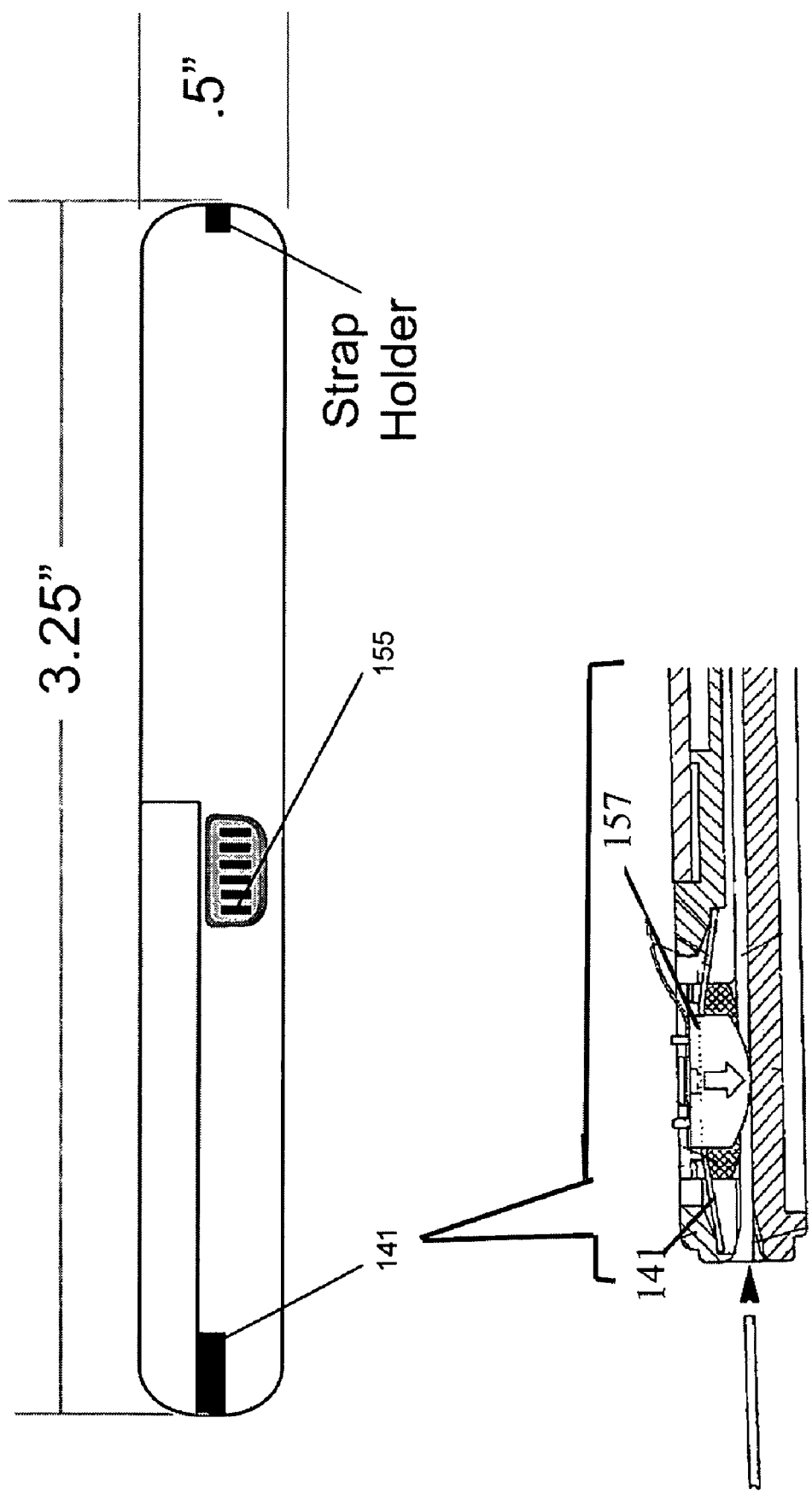
FIG. 3 illustrates the Caddy-Pilot 6 in an open position from the side.

FIG. 1 is an illustration of the Caddy-Pilot 6 in a closed position from the front. FIG. 2 illustrates the Caddy-Pilot 6 in an open position from the front. FIG. 3 illustrates the Caddy-Pilot 6 in an open position from the side. With combined reference to FIGS. 1-3, the Caddy-Pilot 6 is a credit card-sized device housed in a plastic housing for convenient portability, and having an end-wise card insertion port 141 with internal magnetic card strip reader head 157 (FIG. 3, inset), and approximately a 1"×1.25" LCD display screen 144. Internally, the Caddy-Pilot is further comprised of a programmable microprocessor 50 (obscured) capable of executing a program and processing data to verify user identity and perform various input/output tasks as necessary according to the program. The unit also contains internal memory 60 to store program instructions and data necessary for the execution of the specific Caddy-Pilot's intended functions. Input/output functions are accomplished through a Universal Serial Bus connection 155.

The plastic housing is a two-part pull-apart housing formed as shown in FIGS. 1-2, with one of the parts sliding apart approximately one inch to reveal power and authentication LED indicator lights 140, USB control switches 147, 149, and to proved access to the fingerprint scanner 143. Closure of the two-part housing as shown in FIG. 1 protects these components.

The two LED indicator lights 140 indicate power-on, and positive or negative authentication (for example, green "match" or red "no match") of the user's biometric identifiers.

The two USB control switches 147, 149 include USB Off, and USB Connect, respectively. The USB Off switch 147 disconnects the Universal Serial Bus connection 155, while USB Connect switch 149 connects it. All input/output functions are accomplished through a Universal Serial Bus connection 155.

The fingerprint scanner 143 is preferably a conventional capacitive array sensor chip that forms a small panel-mounted fingerprint scanning bed. The LCD display screen 144 preferably comprises an approximate 1"×1.25" supertwist color LCD.

The inset to the bottom of FIG. 3 is a sectional view of the Caddy-Pilot magnetic head 157 as it relates to the card insertion port 141 for accepting a (typical credit magnetic card). The magnetic head 157 is preferably mounted on a leaf spring that biases the head 157 against the card. The head 157 is connected to the internal printed circuit board (upon which the processor 50 resides). A Safe Card ID (as shown in applicant's co-pending U.S. patent application Ser. No. 11/715, 543 filed Mar. 8, 2007), or other credit/debit card is inserted longwise into the insertion port 141. The leaf spring ensures that the magnetic head 157 contacts the magnetic stripe of the magnetic card and reads the data from the card.

Initially the Caddy-Pilot contains a pre-assigned Caddy-Pilot ID number, but no biometric or user-specific information at all, and so the user must activate the device. At the time of assignment to a user, the Caddy-Pilot must be activated by assignment of a unique identification number to the user, and by storage of the ID along with biometric sampling information of the intended user and their digital photo. Once loaded, this information is locked and cannot be changed. Each Caddy-Pilot is specific to one user and essentially becomes that user's access key or single sign-on device.

Figure 4:
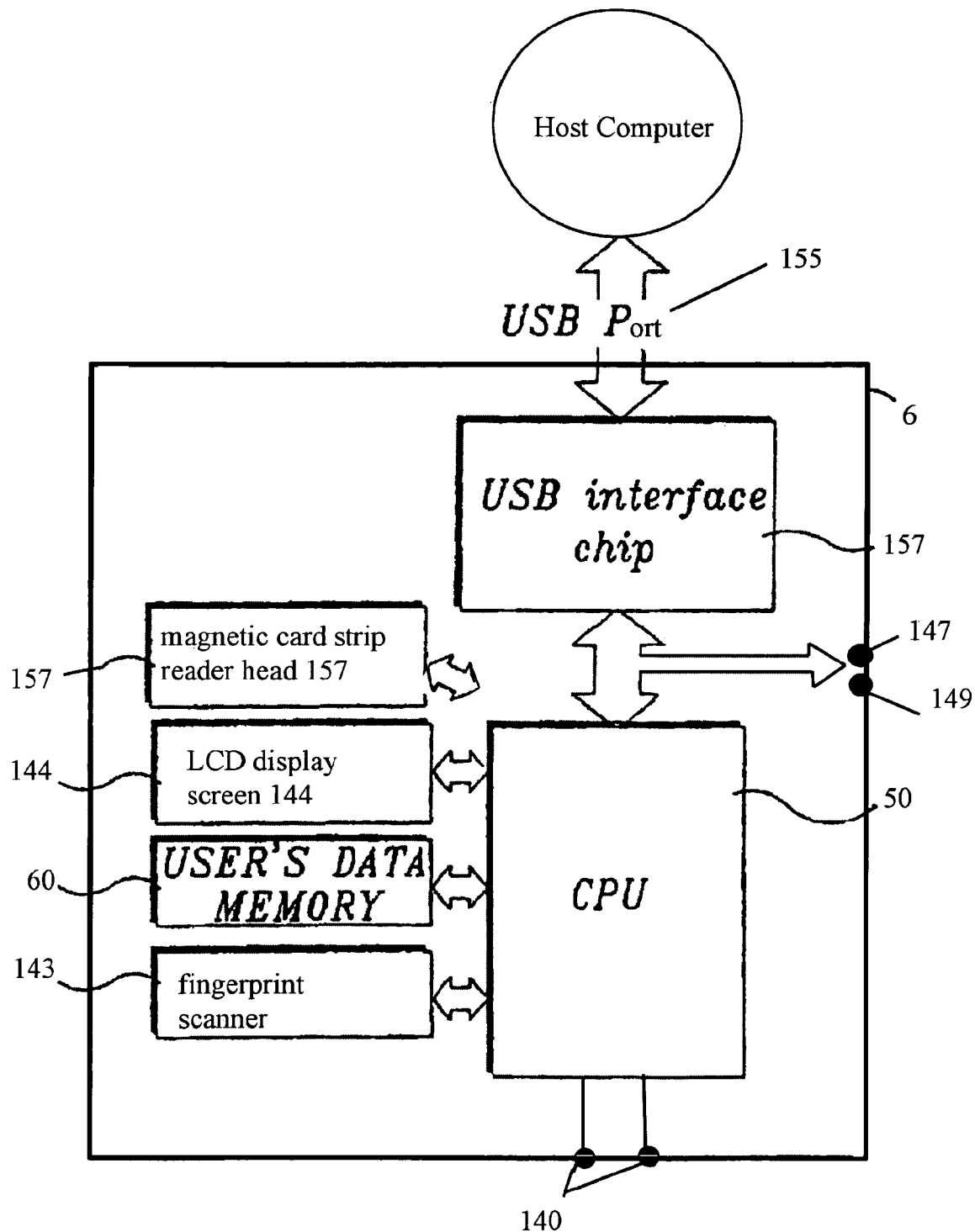
FIG. 4 is a block diagram of the electrical components of the Caddy Pilot 6 according to the present invention, connected to a host computer via USB Port 155.

FIG. 4 is a block diagram of the electrical components of the Caddy Pilot 6 according to the present invention, connected to a host computer via USB Port 155. The USB Port 155 is managed by a conventional on-board USB interface IC 157, which is in turn connected to the microprocessor 50.

Other components connected to the microprocessor 50 include the magnetic card strip reader head 157, LCD display screen 144, and internal memory 60 to store program instructions and data necessary for the execution of the specific Caddy-Pilot's intended functions, additional internal flash memory 60 to store secure user's data for transport, and the fingerprint scanner 143. The two LED indicator lights 140 indicate power-on, and positive or negative authentication of the user's biometric identifiers. The two USB control switches 147, 149 selectively connect and disconnect the Universal Serial Bus connection 155.

Figure 5:
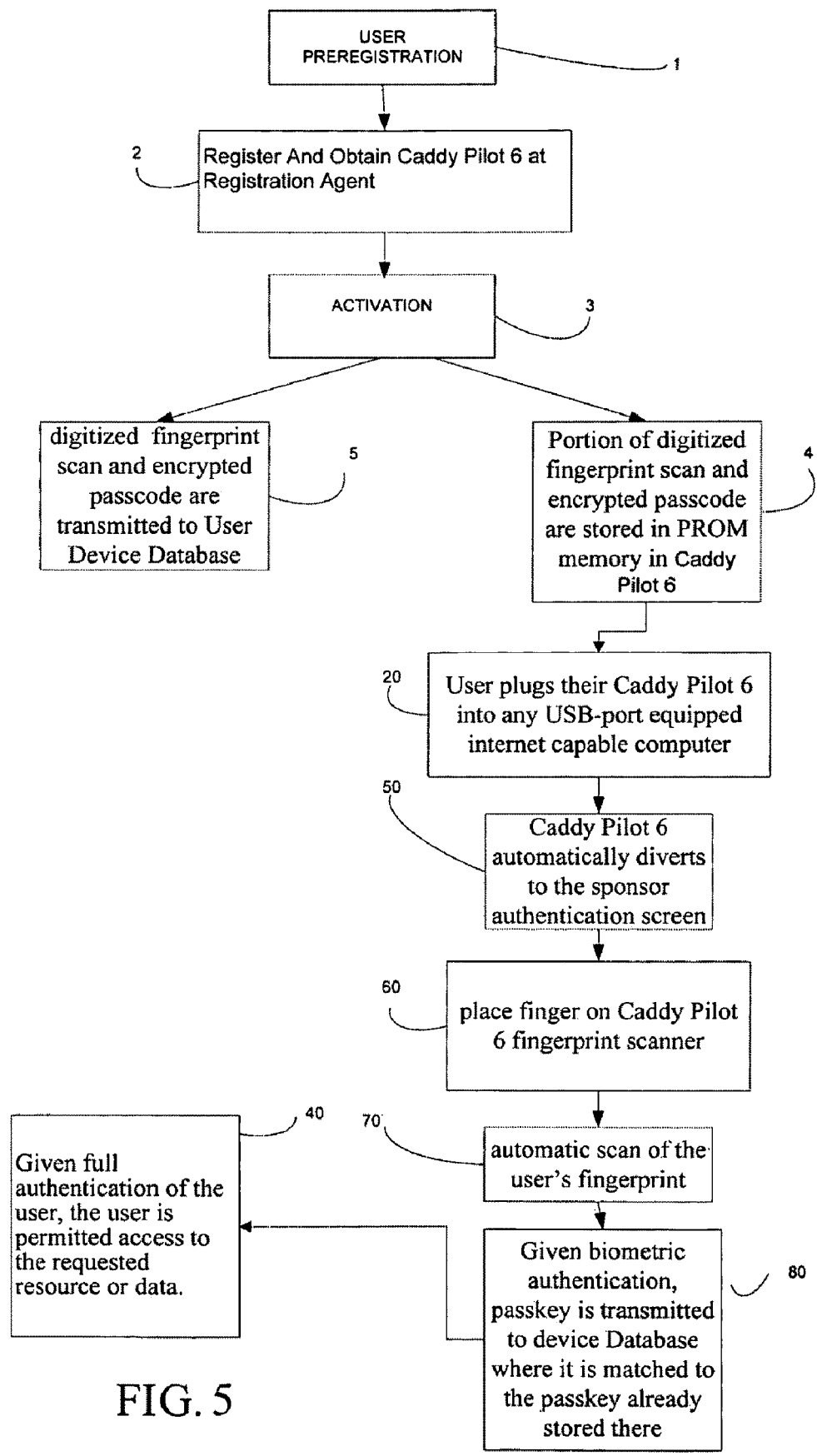
FIG. 5 is a block diagram illustrating the method of operation of the Caddy Pilot 6 according to the present invention.

FIG. 5 is a block diagram illustrating the method of operation of the Caddy Pilot 6 according to the present invention. In general overview, the user at step 1 must preregister with any authorized registration agent, and sign up for the service, similar to opening their first checking/savings account. Personal information is collected, verified, and stored securely by the registration agent, who then gives each user their own Caddy-Pilot 6 (and optionally a Safe Card). The Caddy-Pilot 6 has its internal memory, and device ID number is pre-stored in the internal memory. At pre-registration (step 2) the user is assigned a user ID, and the registration agent compiles a user record including the assigned user ID plus the Caddy-Pilot ID number. The registration agent will also load a digital image of the authorized user for display on the LCD screen 144 for visual authentication.

At pre-registration the user must also activate their Caddy-Pilot 6. As seen at step 3, activation entails an initial scan of the user's fingerprints. The biometric sampling information is collected by the initial scan of the user's fingerprints. At step 6 the fingerprint images are digitized and encrypted and a portion of the digitized encrypted fingerprint scan is stored locally on the internal memory 60 along with the assigned user ID, digital image (and pre-stored Caddy-Pilot ID). The stored portion of the encrypted digitized fingerprint scan comprises a subset of the minutia of the scan. The minutia are derived from the ridges and furrows of the skin in 3D, and are typically located where ridge endings or bifurcations are found. There are various existing open source algorithms for accomplishing this. Approximately 180 points±of minutia per finger enrolled are preferred as this results in a small PROM memory requirement of a minimum of 64 kbytes.

At step 5 the same portion of the encrypted digitized fingerprint scan along with the assigned user ID, pre-stored Caddy-Pilot ID number and digital image are formatted into a record "passkey", and the record is encrypted and forwarded through the sponsor network for storage in the User Device database for later authentication/comparison.

Given a registered and activated Caddy Pilot, as shown in the bottom section of FIG. 5, users may access secured data, utilize single sign-on resources from any web-enabled computer or other web enabled device. To do this, at step 20 they plug the Caddy Pilot 6 into the device's USB port. The Caddy-Pilot 6 is powered by the incoming USB connection. Once powered, the microprocessor 50 is initialized and executes its required program functions.

At step 60, placing a finger on the scanner 144 automatically initiates a scan of the fingerprint. At step 70, the fingerprint scanner 144 instantaneously captures a portion of their fingerprint minutia and sends this data to the processor 50 for comparison with known fingerprint minutia recorded in internal memory 60 at the time of enrollment/registration. This local authentication of user identity is indicated by illumination of the green LED 140, directing the microprocessor 50 to automatically issue a single sign-on sequence or a URL call through the web-enabled device and over the Internet opens a predetermined URL via the sponsor network. If the user cannot be authenticated, the red LED 140 is illuminated and the user may retry the scan or try an alternate enrolled fingerprint.

At step 80, after a positive local authentication has taken place the Caddy-Pilot sends via USB connection and through the web enabled device to which it is connected an encrypted packet of information comprising the assigned Caddy-Pilot ID number and an encrypted biometric personal key. This data is received at the sponsor network and is compared and challenged by the sponsor network with the enrollment record stored in the User Device Database to fully authenticate the user.

At step 40, once authenticated, the user is granted access to the desired resource or data by the sponsor network.

In addition to biometrically authenticated access to data or computing resources via a web enabled device as described above, the Caddy-Pilot may also be used to control access to local network resources and data or even non-networked resources and data through a single sign-on sequence, without user-typed passwords. Where access to a local network resource or data is desired, the authentication process operates as described above except that the sponsor network is replaced by the local network and each resource computer, database, etc. on the network is configured to require verification by biometric authentication before the resource is made available. For example, if a user wanted to use computer workstation on a local network secured by the Caddy-Pilot 6, he would connect his enrolled Caddy-Pilot to the network and follow the authentication steps as described above. Software on the local network would restrict access to the workstation until it received notification of authentication from the local network, at which time the resource would be unlocked. This scenario allows local network administrators to centrally control the access to resources by all users and provides security through biometric verification with an individual single sign-on device. Further, access control can be implemented with respect to a single, non-networked device such as a stand alone workstation, PDA or cell phone.

In addition to restricting and controlling access to local network and internet-networked resources, the Caddy-Pilot may provide up to 8 gigabytes of internal memory 60 on which a user may store data securely and restrict access by biometric authentication. Data stored securely on the internal memory 60 of the Caddy-Pilot is accessed by local authentication of the users fingerprint only and does not require communication with a local network or via the internet.

The Caddy-Pilot is equipped with the magnetic card strip reader 157 to facilitate secure payment transactions with credit and/or debit cards, again given proper local as well as network authentication.

The Caddy-Pilot may be specially-activated for controlling child access to online content. In this case, a child may acquire and enroll a, Caddy-Pilot for Kids, through their school registration agent signing up for the service, and enrolling them in a like manner. Each child is issued a separate Safe Card 2. The child-user simply connects their Caddy-Pilot 6 to their USB-equipped device, inserts their Safe Card into the Caddy 6, and places their finger over the biometric sensor on the Safe Card 2. Authentication is instantaneous since the Safe Card contains its own built-in biometric recognition system and The Caddy-Pilot 6 verifies the child-issued Safe Card 2 by displaying their user ID number, time/date code, and picture on LCD screen 144. After user verification, all of that child's internet access is restricted in accordance with the sponsor network's pre-programmed parental controls Ruleset. The Ruleset may comprise a list of global rules and specific rules regarding of individual URLs which will be blocked or allowed, or calendar of time periods and days, which will be blocked or allowed, or otherwise. All of the child's internet access is fully secured.

It should now be apparent that the above-described method, system architecture, and peripheral components inclusive of a card scanner 6 and intelligent Caddy-Pilot for Kids 4 facilitates biometric-secure internet access for adult users and children without exposing any personal information.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A method for using an intelligent docking station for SAFE Cards and magnetic swipe cards, (i.e. credit cards, ATM cards) for biometric authentication of an authorized user of a smart card issued with an identification number unique to said authorized user, and secure access to computer and/or electronic data, services or resources via a single sign-on sequence, the intelligent docking station comprising a housing defining an end-wise card insertion port, a magnetic card strip reader head positioned inside said housing, a smart card sensor head positioned inside said housing, a infrared receiver/transmitter positioned inside said housing, a capacitive array panel-mounted fingerprint scanner for capturing a portion of a user's fingerprint minutia when a user swipes their finger, an LCD display screen, a programmable microprocessor and PROM memory, a USB Port for communicating with a host computer, and red and green LED indicator lights for indicating positive or negative local authentication, respectively, of a user's biometric identity; the method comprising the steps of;

issuing an unactivated intelligent docking station to a user, said intelligent docking station having a device ID number prestored in said PROM memory;

pre-registering said user by assigning a user ID, and recording said user ID and device ID number in a separate database hosted by a web-enabled sponsor network;

initiating a real time fingerprint scan by activating said intelligent docking station by said user placing a finger on said fingerprint scanner, enrolling said user with said intelligent docking station by storing a digitalized subset of scan minutia of said registered user's scanned fingerprint data in said PROM memory;

connecting said intelligent docking station by said USB port to a network device having online access;

receiving a smart card in said intelligent docking station;

obtaining a real time fingerprint scan by placing a finger on said fingerprint scanner and initiating and controlling a scanning operation at said intelligent docking station;

determining that a match exist by comparing by said programmable microprocessor a subset of the minutia of the real time fingerprint scan to the enrolled scan minutia;

based on said determination by said programmable microprocessor illuminating said green LED indicator light, and automatically transmitting an encrypted packet of information comprising said assigned user ID and device ID number through the network device USB port to said web-enabled sponsor network;

authenticating said user by receiving said encrypted user ID and device ID number, and decrypting the user ID and the device ID number at the sponsor network and comparing to the user ID and the device ID number stored in the separate database of said web-enabled sponsor network during said preregistration step;

based on said comparing, providing access via said network device to a network resource.

\* \* \* \* \*